Sept. 26, 1961

H. T. HUTTON, JR 3,001,374

CARBON DIOXIDE PRESSURE REDUCING
METHOD AND APPARATUS

Filed April 3, 1959

INVENTOR.
HARRY T. HUTTON, JR.

BY

ATTORNEY & AGENT

United States Patent Office 3,001,374
Patented Sept. 26, 1961

3,001,374
CARBON DIOXIDE PRESSURE REDUCING
METHOD AND APPARATUS
Harry T. Hutton, Jr., Franklin Park, N.J., assignor to
Air Reduction Company, Incorporated, New York,
N.Y., a corporation of New York
Filed Apr. 3, 1959, Ser. No. 803,899
6 Claims. (Cl. 62—50)

This invention relates to the art of gas pressure reduction and regulation, and more particularly, to an improved method and apparatus for reducing the pressure of carbon dioxide to effectively control the expansion from liquefied carbon dioxide at superatmospheric pressure to gaseous carbon dioxide at substantially atmospheric pressure without causing the formation of particles of solid carbon dioxide.

Carbon dioxide has many, diverse and widespread uses. In the interest of minimizing transportation costs and for other reasons, it is generally the practice to load high pressure cylinders with liquefied carbon dioxide at the point of manufacture and ship the carbon dioxide in the cylinders to the place of use where the liquid is vaporized for use in the gaseous phase.

Gaseous carbon dioxide is usually consumed or utilized at atmospheric pressure. Since at a temperature of 70° F. the carbon dioxide gas and liquid are in equilibrium in the cylinder at a pressure of approximately 853 pounds per square inch absolute, it is necessary that the gas in a cylinder be expanded through the medium of suitable pressure reducing and regulating means to reduce its pressure to the desired delivery pressure which frequently is substantially atmospheric pressure.

Carbon dioxide has the uncommon characteristic, under certain conditions, of transforming directly from gas to solid and vice versa without passing through the liquid phase. As a result the uncontrolled expansion of high pressure gas can produce solid particles. Solid carbon dioxide is formed when the gas is expanded to a pressure below about 75 pounds per square inch absolute at a temperature at or below approximately —70° F. The solid particles of carbon dioxide and any trace of water ice that may result from condensation of trace amounts of water vapor often present in commercially pure carbon dioxide, may form or collect in various parts of the pressure regulating means, including the valve seats. This frequently interferes with proper operation of the pressure regulating equipment and may even interrupt gas flow.

It has been the practice in the past to avoid this difficulty by heating the high pressure gas before it passes through the pressure reducing valve by means of electrical heating means or the like. The high pressure gas is heated sufficiently so that, even though subsequently chilled by the expansion, it will still be above the temperature at which solid carbon dioxide forms at the delivery pressure. Such heating means are usually delicate, complex, expensive in manufacturing and operating costs, and require a separate source of heat or heat energy supplied at relatively high temperature.

The present invention eliminates the need for costly electrical or electro-mechanical equipment to supply necessary heat to the gas during expansion for the purpose of avoiding formation of solid carbon dioxide. In accordance with this invention heat is supplied to the carbon dioxide in the amount required at some predetermined intermediate pressure by heat which is absorbed from the ambient atmosphere in a simple form of heat exchanger.

An object of this invention, therefore, is to provide an improved and economical method of effectively controlling expansion of liquefied carbon dioxide to gaseous carbon dioxide at atmospheric pressure without causing solid carbon dioxide to be formed in the course of such expansion.

Another object of the invention is to provide a method and apparatus for expanding carbon dioxide from saturated vapor in equilibrium with liquid at superatmospheric pressure and at room temperature to gas at substantially atmospheric pressure without causing solid phase carbon dioxide to be formed and without requiring a heat source having a temperature above room temperature.

Another object of the invention is to utilize thermal energy of the ambient atmosphere to raise the enthalpy of carbon dioxide in the course of expanding the same through pressure reducing and regulating means, from a liquefied state at substantially the temperature of the ambient air to a gaseous state at atmospheric pressure without causing the formation of solid phase carbon dioxide.

The enumerated objects and additional objects, together with the advantages of the invention, will be readily apparent to persons trained in the art from the following detailed description taken in conjunction with the accompanying drawing:

Figures 1, 2:
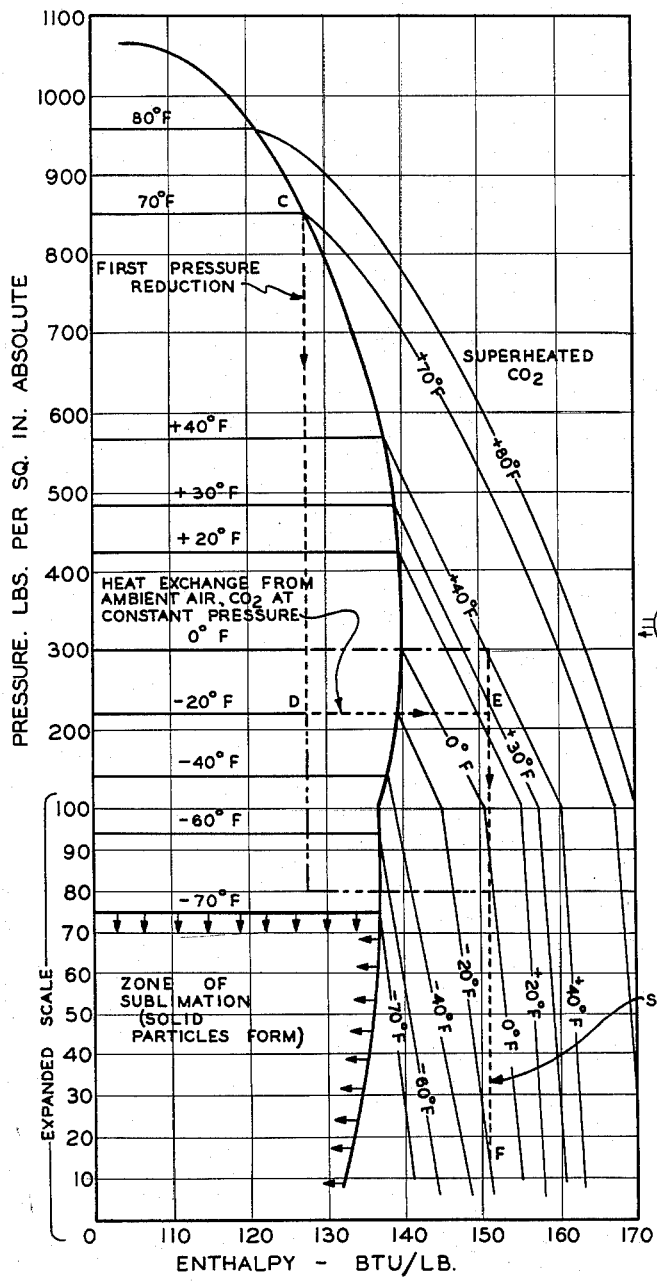
FIG. 1 is a portion of the pressure-enthalpy chart for carbon dioxide.
FIG. 2 is a partly diagrammatic view of an arrangement of apparatus suitable for the practice of the present invention.

Referring initially to FIG. 1, the same depicts a portion of the pressure-enthalpy chart for carbon dioxide wherein the coordinates are pressure in pounds per square inch absolute and enthalpy in B.t.u. per pound. The areas in which carbon dioxide exists in its various phases are shown as well as certain isotherms or constant temperature lines. The area within which the carbon dioxide exists in solid phase must be avoided if regulator freezing is to be prevented. It may be seen that solid carbon dioxide cannot form above a pressure of about 75.1 p.s.i. at or above a temperature of about —70° F.

As was stated earlier herein, carbon dioxide gas and liquid are in equilibrium at room temperature (about 70° F.) at a pressure of about 853 pounds per square inch absolute. The pressure-enthalpy relation for the gas in a cylinder under these conditions is represented by the point designated C on the saturated vapor line. If the gas is allowed to expand substantially adiabatically (constant enthalpy) to atmospheric pressure, particles of solid carbon dioxide will be formed at pressures below 75 pounds per square inch absolute. According to the present invention applicant avoids such solid carbon dioxide formation by effecting pressure reduction in two stages and adding heat to the gas after the first stage reduction but prior to the second stage reduction and at a pressure not less than 75 pounds per square inch absolute, the critical pressure referred to above.

The method of this invention is adapted to be performed by an arrangement of apparatus of the character shown in FIG. 2, which will now be described. This apparatus comprises a closed receptacle 10, such as a high pressure cylinder, for containing a supply of liquefied carbon dioxide 11. The cylinder is provided with a discharge valve 12 that communicates with a first pressure regulating valve means 13. The downstream side of regulating means 13 is connected to the upstream side of a second pressure regulating valve means 14 through the intermediary of a conduit means 15 which includes piping 16 that is provided with a series of spaced heat conductive fins 17 to effect desired heating of the carbon dioxide as it passes through the piping by indirect heat exchange with the ambient atmosphere.

In carrying out the method of the invention, gaseous carbon dioxide residing above the liquid in receptacle 10 is discharged through valve 12 and allowed to expand through first pressure regulating means 13 to a pressure of not less than 75 pounds per square inch absolute, under substantially adiabatic (constant enthalpy) conditions. The preferred first stage expanded pressure for commercial grades of substantially pure carbon dioxide is from 80 to 305 pounds per square inch absolute and about 215 pounds per square inch absolute is recommended. Adiabatic expansion from 853 pounds per square inch to 215 pounds per square inch lowers the temperature of the gas from 70° F. to about −20°. This expansion is represented by the dotted lines C—D of FIG. 1. The carbon dioxide gas admitted into conduit means 15 is maintained at this reduced pressure and is simultaneously heated by ambient heat exchange through the conduit means to a temperature of about 20° F. which is identified by point E on the chart. It will be observed that point E represents an enthalpy value above the maximum at which solid carbon dioxide can exist. The gas is then expanded through a second stage pressure regulating means 14 directly to the desired delivery pressure, which may be substantially atmospheric pressure, to a point F on the chart. It will be observed that gas expansion between points E and F is to the right and completely outside of the zone of sublimation. As a consequence, no solid carbon dioxide is formed during the second stage pressure reduction. Furthermore, there is no danger of any slight amounts of moisture entrained in the carbon dioxide being frozen during the second stage pressure reduction since the temperature at point F is above −30° F., the assumed dew point of entrained moisture.

Selection of an intermediate pressure in the range of from 80 to 305 pounds per square inch is significant in that the adiabatic expansion from the starting pressure which is of the order of 850 pounds per square inch to an intermediate pressure in this range depresses the gas temperature from the starting temperature, which may be the temperature of the ambient air (for example 70° F.), to a temperature of the order of from 0° F. to −60° F. This refrigeration effect in the first stage of expansion provides a temperature differential between the ambient air and the carbon dioxide being expanded that is sufficient to permit adequate heat pick-up by the gas in an ambient air heat exchanger. With this system no high temperature heat source is required. The selection of the intermediate pressure referred to above is also significant in that it precludes any possibility of the formation of particles of solid carbon dioxide, inasmuch as carbon dioxide cannot exist in solid phase above a pressure of about 75 pounds per square inch. With the gas at a temperature below 0° F. it is a simple matter to add to its enthalpy to raise it to a value sufficient to assure freedom from solid particles when it is expanded from the intermediate pressure to the final pressure. In the case of first stage pressure reduction to 305 pounds per square inch absolute, the carbon dioxide passing through conduit means 15 must be heated by heat exchange with the 70° F. ambient atmosphere from 0° F. to about 40° F.

In the case of first stage pressure reduction to 80 pounds per square inch absolute, the carbon dioxide must be heated from about −67° F. to about 0° F. by heat picked up from the 70° F. ambient air. Because a smaller heat exchanger is required under these latter conditions as a result of the greater temperature differential it is obviously advantageous in theory to work toward the lower end of the intermediate pressure range. However, it is preferred to operate at temperatures above that at which any water vapor in the carbon dioxide can condense and freeze, and for this reason an intermediate pressure of the order of 200 p.s.i. is preferred.

While FIG. 2 shows the ambient air heat exchanger as comprising piping 16 having heat conductive fins 17, it should be borne in mind any form of heat exchanger may be used. For example the conduit means may consist of bare tubing that is devoid of fins. Moreover, the piping need not be bent, as illustrated, but may be in the form of a coil or may have any other desired configuration. It is, of course, important that the material of the conduit means have a suitable heat transfer coefficient. Several metals including aluminum and copper, are among preferred materials for the conduit means.

Examples I and II below set forth the materials and certain dimensions of the corresponding conduit means used in carrying out the method of the invention to meet the following requirements:

(a) Gas inlet temperature _____ −20° F.
(b) Operating pressure _____ 200 pounds per square inch gauge.
(c) Outlet temperature _____ +20° F.
(d) Temperature of ambient atmosphere _____ +70° F.
(e) Required enthalpy change _____ 21 B.t.u. per pound of carbon dioxide.

*Example I*

The conduit means comprised finned copper tubing having an outside surface area of 1.16 square feet per linear foot. The length of the tubing, based on calculations to effect the required enthalpy change, was 19.5 inches and satisfied a required flow rate of 9.2 pounds of carbon dioxide per hour.

*Example II*

Here the conduit means comprised bare aluminum tubing having an outside surface area of .098 square feet per linear foot. The length of this tubing, based on calculations to effect the required enthalpy change, was 9.9 feet and satisfied a required flow rate of 4.6 pounds of carbon dioxide per hour.

From the foregoing it is believed that the benefits obtainable by the practice of the present invention will be readily apparent to persons skilled in the art without further description. However, since certain changes may be made in carrying out the present method without departing from the spirit of the invention, it is intended that all matter contained herein shall be interpreted as illustrative and explanatory, rather than in a limiting sense.

I claim:

1. A method for expanding gaseous carbon dioxide in equilibruim with liquid at superatmospheric pressure at substantially the temperature of the ambient air to a predetermined lower delivery pressure where the pressure differential between the said equilibrium pressure and the said lower delivery pressure is sufficient to cause the formation of solid carbon dioxide if the gaseous carbon dioxide is expanded without addition thereto of heat which comprises expanding said gaseous carbon dioxide to an intermediate pressure low enough to reduce the temperature of the gas by at least 70° F. but not less than 80 pounds per square inch absolute, supplying heat to said gas by heat exchange with said ambient air to raise the temperature thereof to a value whereby further expansion of said gas will not cause the formation of solid carbon dioxide, and further expanding said gas from said intermediate pressure to said predetermined delivery pressure.

2. In a method of regulating the pressure of a fluid consisting of substantially pure carbon dioxide that is contained in a closed receptacle under a pressure of approximately 853 pounds per square inch absolute at a temperature of about 70° F. and that consists of gaseous carbon dioxide in equilibrium with liquid carbon dioxide, the steps of transmitting gaseous carbon dioxide from the receptacle through first pressure regulating means to obtain a stream of carbon dioxide gas having a pressure within the range of about 305 to 80 pounds per square inch absolute and a temperature within the range of about 0° F. to −67° F., passing the stream of gas from the first pressure regulating means to second pressure regulating means through the intermediary of a heat conductive conduit means, maintaining the gas at a pressure within said pressure range during its passage through the conduit means and simultaneously raising the temperature of such gas to a value within the range of about 40° F. to −60° F. by the addition of heat which is absorbed from the ambient atmosphere by heat exchange through the conduit means, and then transmitting the stream of gas through the second pressure regulating means to reduce the pressure thereof to approximately atmospheric.

3. In a method of regulating the pressure of a fluid consisting of substantially pure carbon dioxide that is contained in a closed receptacle under a pressure of approximately 853 pounds per square inch absolute at a temperature of about 70° F. and that consists of gaseous carbon dioxide in equilibrium with liquid carbon dioxide, the steps of transmitting gaseous carbon dioxide from the receptacle through first pressure regulating means under substantially adiabatic conditions to obtain a stream of carbon dioxide gas having a pressure within the range of about 305 to 80 pounds per square inch absolute and a temperature within the range of about 0° F. to −67° F., passing the stream of gas from the first pressure regulating means to second pressure regulating means through the intermediary of a conduit means, maintaining the gas at a pressure within said pressure range during its passage through the conduit means and simultaneously raising the temperature of such gas to a value within the range of about 40° F. to −50° F., and then transmitting the stream of gas through the second pressure regulating means under substantially adiabatic conditions to reduce the pressure thereof to approximately atmospheric.

4. In a method of regulating the pressure of a fluid consisting of substantially pure carbon dioxide that is contained in a closed receptacle under a pressure of approximately 853 pounds per square inch absolute at a temperature of about 70° F. and that consists of gaseous carbon dioxide in equilibrium with liquid carbon dioxide, the steps of transmitting gaseous carbon dioxide from the receptacle through first pressure regulating means under substantially adiabatic conditions to obtain a stream of carbon dioxide gas having a pressure within the range of about 305 to 80 pounds per square inch absolute and a temperature within the range of about 0° F. to −67° F., passing the stream of gas from the first pressure regulating means to second pressure regulating means through the intermediary of a conduit means, maintaining the gas at a pressure within said pressure range during its passage through the conduit means and simultaneously raising the temperature of such gas to a value within the range of about 40° F. to −60° F. by the addition of heat which is absorbed from the ambient atmosphere by heat exchange through the conduit means, and then transmitting the stream of gas through the second pressure regulating means under substantially adiabatic conditions to reduce the pressure thereof to approximately atmospheric.

5. In a method of regulating the pressure of a fluid consisting of substantially pure carbon dioxide that is contained in a closed receptacle under a pressure of approximately 853 pounds per square inch absolute at a temperature of about 70° F. and that consists of gaseous carbon dioxide in equilibrium with liquid carbon dioxide, the steps of transmitting gaseous carbon dioxide from the receptacle through first pressure regulating means to obtain a stream of carbon dioxide gas having a pressure of about 215 pounds per square inch absolute and a temperature of about −20° F., passing the stream of gas from the first pressure regulating means to second pressure regulating means through the intermediary of a heat conductive conduit means, maintaining the gas at about said last-mentioned pressure during its passage through the conduit means and simultaneously raising the temperature of such gas to a value within the range of about 20° F. to 30° F. by the addition of heat which is absorbed from the ambient atmosphere by heat exchange through the conduit means, and then transmitting the stream of gas through the second pressure regulating means to reduce the pressure thereof to approximately atmospheric.

6. In the art of expanding carbon dioxide gas from a given high supply pressure to a lower delivery pressure where the pressure drop from said supply pressure to said delivery pressure is sufficient to cause the formation of solid carbon dioxide if heat is not added to the gas, the improvement which comprises arresting the expansion at an intermediate pressure above the pressure at which solid carbon dioxide can form and below the pressure that would provide an insufficient temperature differential between the partially explained carbon dioxide gas and the ambient air to enable heat to be transferred to said partially expanded carbon dioxide gas from the ambient air, supplying heat to said partially expanded carbon dioxide gas by transfer of heat thereto from the ambient air in an amount sufficient to prevent the formation of solid carbon dioxide upon the expansion of the heated carbon dioxide gas from said intermediate pressure to said lower delivery pressure, and further expanding said carbon dioxide gas from said intermediate pressure to said lower delivery pressure.

References Cited in the file of this patent

UNITED STATES PATENTS

| | | |
|---|---|---|
| 1,970,058 | Ruff | Aug. 14, 1934 |
| 2,477,566 | Baker et al. | Aug. 2, 1948 |
| 2,525,874 | Larzelere | Oct. 17, 1950 |
| 2,645,906 | Ryan | July 21, 1953 |
| 2,670,605 | Van Zandt et al. | Mar. 2, 1954 |
| 2,823,521 | Enger et al. | Feb. 18, 1958 |